United States Patent
Schaefer et al.

(10) Patent No.: US 7,683,198 B2
(45) Date of Patent: Mar. 23, 2010

(54) PROCESS FOR PREPARING DIORGANOPOLYSILOXANES

(75) Inventors: Oliver Schaefer, Burghausen (DE); Sandra Bachmaier, Egglsberg (AT)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 11/914,480

(22) PCT Filed: May 11, 2006

(86) PCT No.: PCT/EP2006/004449

§ 371 (c)(1),
(2), (4) Date: Nov. 15, 2007

(87) PCT Pub. No.: WO2006/122704

PCT Pub. Date: Nov. 23, 2006

(65) Prior Publication Data

US 2008/0167487 A1    Jul. 10, 2008

(30) Foreign Application Priority Data

May 18, 2005   (DE) .................. 10 2005 022 856

(51) Int. Cl.
*C07F 7/04* (2006.01)
(52) U.S. Cl. .................................... 556/457
(58) Field of Classification Search .............. 524/860, 524/858; 528/10, 12, 14, 29
See application file for complete search history.

(56) References Cited

U.S. PATENT DOCUMENTS 3,445,426 A    5/1969   Chi-Long Lee
5,223,595 A *  6/1993   Stepp et al. .................. 528/14
2003/0229193 A1* 12/2003 Stepp et al. .................. 528/10

FOREIGN PATENT DOCUMENTS

| DE | 41 16 014 A1  | 11/1992 |
| DE | 100 51 886 C1 | 1/2002  |
| DE | 101 09 842 A1 | 10/2002 |
| DE | 102 19 734 A1 | 6/2003  |
| DE | 103 03 693 A1 | 8/2004  |
| EP | 0 331 753 A1  | 9/1989  |
| EP | 0 338 577 A2  | 10/1989 |
| EP | 1 369 449 A1  | 12/2003 |

OTHER PUBLICATIONS

U.S. 5,223,595 is the English equivalent to DE 4 116 014 A1.
U.S. 2003/0229193 is the English equivalent to EP 1 369 449 A1.
English Patent Abstract corresponding to DE 100 51 886 C1.
English Patent Abstract corresponding to DE 103 03 693 A1.
English Patent Abstract corresponding to DE 102 19 734 A1.
Tartakovskaya et al., Vysokomol. Soedin. Ser. vol. 26, p. 234, 1984.
Chemical Abstracts vol. 101, 73186d, 1984, corresponding to Tartakovskaya et al., Vysokomol. Soedin. Ser. vol. 26, p. 234, 1984.
Tartakovskaya et al., Vysokomol. Soedin. Seri. vol. 26, p. 234, 1984.
Chemical Abstract vol. 101, 73186d, 1984, corresponding to Tartakovskaya et al., Vysokomol. Soedin. Ser. vol. 26, p. 234, 1984.

* cited by examiner

*Primary Examiner*—Sikarl A Witherspoon
*Assistant Examiner*—Chukwuma O Nwaonicha
(74) *Attorney, Agent, or Firm*—Brooks Kushman P.C.

(57) ABSTRACT

Mono-hydroxyl-functional organopolysiloxanes are prepared with minimal byproducts and increased storage stability by reaction of cyclotrisiloxanes with sil(ox)anols containing less than 1 weight percent water in the presence of heterogenous alkali metal or alkaline earth metal oxide or carbonate catalysts.

11 Claims, No Drawings

PROCESS FOR PREPARING DIORGANOPOLYSILOXANES

CROSS-REFERENCE TO RELATED APPLICATION

This application is the U.S. national phase of PCT Appln. No. PCT/EP2006/004449 filed May 11, 2006 which claims priority to German Application DE 10 2005 022 856.9 filed May 18, 2005.

BACKGROUND OF THE INVENTION

1. Field of the Invention

The invention relates to a process for preparing diorganopolysiloxanes which have an Si-bonded hydroxyl group only at one end of the molecule's chain.

2. Description of the Related Art

U.S. Pat. No. 3,445,426 A discloses the polymerization of hexaorganocyclotrisiloxane in the presence of catalytic amounts of a pentacoordinated silicon catalyst, an alkali metal, ammonium or phosphonium siliconate. The catalysts, however, have the disadvantage that they are costly and inconvenient to prepare and are very sensitive to moisture. Described as an initiator for the ring-opening polymerization is alcohol in combination with water, which always leads to polymer mixtures, i.e., to OH-terminated polymers and monoalkoxy-terminated polymers.

EP 0 331 753 A1 describes the polymerization of hexaorganocyclotrisiloxanes in the presence of sil(ox)anols and with the aid of alkali metal sil(ox)anolates as polymerization initiators. Alkali metal sil(ox)anolates likewise exhibit a sensitivity to moisture. In this case the catalysts used are organometallic compounds, which, as mentioned, possess an extreme sensitivity to moisture.

EP 0 338 577 A2 discloses the polymerization of hexamethylcyclotrisiloxane in the presence of trialkylsilanol and a lithium catalyst such as butyllithium. The use of organometallic compounds, however, is problematic from a safety standpoint.

L. M. Tartakovskaya et al., Vysokomol. Soedin. Ser. B 26 234, 1984 (Chemical Abstracts vol. 101, 73186d, 1984) describe the ring opening and polymerization of cyclic siloxanes in the presence of fluoride ions. On account of their toxicity, these catalysts are adjudged disadvantageous in industrial use.

DE 41 16 014 A1 describes the polymerization of cyclic siloxanes with catalysts comprising fluoride ions. These fluoride catalysts, however, have the disadvantage of side reactions with siloxanes, forming Si—F units. Moreover, the disclosed catalysts also exhibit toxicity, which makes industrial use more difficult.

EP 1 369 449 A1 discloses the polymerization of cyclic siloxanes with alcohols as initiator, with carbonate salts used as catalysts. The compounds obtained in this way, however, have the disadvantage of the formation of an alkoxy-silyl end group, which is not stable on storage. For example it may react with the silanol compound that is likewise present, with elimination of alcohol, and so may lead to chain extension.

The current processes therefore all have the disadvantage either of leading to unstable products or else of using reactants and/or catalysts that are problematic from a safety standpoint.

SUMMARY OF THE INVENTION

It is an object of the present invention, therefore, to provide a process for preparing diorgano(poly)siloxanes which have an Si-bonded hydroxyl group only at one end of the molecule's chain, this process leading to storage-stable products which, if desired, may be further functionalized. The reactants used in this preparation ought to be stable, readily accessible, and relatively unproblematic from a safety standpoint. These and other objects have surprisingly been discovered by the process of the invention, wherein cyclic trisiloxanes are reacted with sil(ox)anols having a water content of less than 1% by weight.

DETAILED DESCRIPTION OF THE PREFERRED EMBODIMENT

The invention accordingly provides a process for preparing diorgano(poly)siloxanes of the general formula (I)

$$R^1R_2Si(OSiR_2)_m(OSiR^2_2)_nOH \quad (I),$$

by reacting hexaorganocyclotrisiloxane of the general formula (II)

$$(R^2_2SiO)_3 \quad (II)$$

with sil(ox)anol of the general formula (III)

$$R^1R_2Si(OSiR_2)_mOH \quad (III)$$

in the presence of a catalyst and, if desired, of further additives selected from the group containing driers, solvents, phase transfer catalysts, lithium compounds or mixtures thereof, where
  R independently at each occurrence is a monovalent, unsubstituted or substituted $C_1$-$C_{13}$ hydrocarbon radical,
  $R^1$ is a hydrogen atom or an unsubstituted or substituted $C_1$-$C_{13}$ hydrocarbon radical,
  $R^2$ independently at each occurrence is a monovalent, unsubstituted or substituted $C_1$-$C_{13}$ hydrocarbon radical,
  m is 0 or an integer of at least 1 to 3 and
  n is an integer of at least 3 to 1000, characterized in that the sil(ox)anols of the general formula (III) employed possess a water content of below 1% by weight.

Preferably m is a 0, 1, 2 or 3, and preferably n is an integer from 3 to 999, with particular preference from 9 to 150.

Examples of hydrocarbon radicals R are alkyl radicals such as the methyl, ethyl, n-propyl, isopropyl, n-butyl, isobutyl, tert-butyl, n-pentyl, isopentyl, and neopentyl tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical; alkenyl radicals, such as the vinyl and the allyl radical; cycloalkyl radicals, such as cyclopentyl, cyclohexyl, cycloheptyl and methylcyclohexyl radicals; aryl radicals such as the phenyl and the naphthyl radicals; alkaryl radicals such as the o-, m-, p-tolyl radicals, xylyl radicals, and ethylphenyl radicals; and aralkyl radicals, such as the benzyl radical and the alpha- and the beta-phenylethyl radicals.

Examples of substituted hydrocarbon radicals R are haloalkyl radicals such as the 3,3,3-trifluoro-n-propyl radical, 2,2,2,2',2',2'hexafluoroisopropyl radical, the heptafluoroisopropyl radical; haloaryl radicals such as the o-, m- and p-chlorophenyl radicals; and acyloxyalkyl radicals, such as the acetoxyethyl radical and (meth)acryloyloxypropyl radical.

The examples given above of hydrocarbon radicals R and substituted hydrocarbon radicals R also fully apply to hydrocarbon radicals $R^1$ and also $R^2$ and to substituted hydrocarbon radicals $R^1$ and also $R^2$. Preferably R is an alkyl radical, with particular preference, a methyl radical. Preferably $R^1$ is a hydrogen atom, alkyl radical, alkenyl radical or substituted hydrocarbon radical, with particular preference a methyl, vinyl, allyl or (meth)acryloyloxypropyl radical. Preferably $R^2$ is an alkyl radical, with particular preference a methyl radical.

Examples of the preferred, inventive diorgano(poly)siloxanes of the general formula (I) are those of the following formulae:

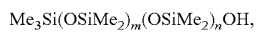

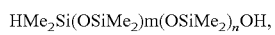

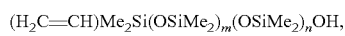

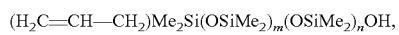

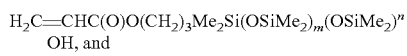

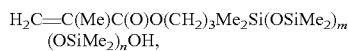

where Me is a methyl radical and m and n are as defined above.

The inventive diorgano(poly)siloxanes of the general formula (I) preferably display a viscosity of 4 to 9L150\f"Wingdings2"\s1210⁵ mPa·s at 25° C.

Examples of the hexaorganocyclotrisiloxanes used in the process of the invention, of the general formula (II), are hexamethylcyclotrisiloxane, hexaethylcyclotrisiloxane, 1,3,5-trimethyl-1,3,5-triethylcyclo-2,4,6-trisiloxane, 1,3,5-trimethyl-1,3,5-triphenylcyclo-2,4,6-trisiloxane, and 1,3,5,-trimethyl-1,3,5-tris(3,3,3-trifluoropropyl)cyclo-2,4,6-trisiloxane. In the process of the invention hexamethylcyclotrisiloxane is used with preference as hexaorganocyclotrisiloxane of the general formula (II).

The ratio of hexaorganocyclotrisiloxane of the general formula (II) to silanol of the general formula (III) that is employed in the process of the invention determines the average chain length of the product. Hexaorganocyclotrisiloxane of the general formula (II) is employed preferably in amounts of 1 to 333 mol, more preferably in amounts of 1 to 70 mol, based in each case on 1 mol of silanol (III).

The triorganosiloxy group at the end of the molecule's chain in the diorgano(poly)siloxane of the general formula (I) that is prepared in the process of the invention is introduced via the sil(ox)anol of the general formula (III) that is employed.

As siloxanol of the general formula (III) it is preferred to employ triorganosilanol, with particular preference trimethylsilanol or vinyldimethylsilanol. The introduction, for example, of the vinyldimethylsiloxy or perfluoroalkyldimethylsiloxy group may take place via oligomeric or polymeric sil(ox)anols, owing to the instability of the corresponding sil(ox)anols. Tetrasiloxanols are readily accessible via the reaction of hexaorganocyclotrisiloxane with the corresponding chlorosilane. This is described, for example, in DE 29 18 312 A1, whose disclosure in this context is also incorporated herein by reference. An example of one such siloxanol is alpha-hydroxy-omega-vinyldimethylsiloxyhexamethyltrisiloxane.

Disiloxanes or polysiloxanes formed in the course of storage or during the reaction as a result of condensation of the sil(ox)anol of the general formula (III) that is employed do not disrupt the course of the reaction.

The sil(ox)anols of the general formula (III) that are employed should preferably possess a water content of below 1% by weight. Very particular preference is given to a water content of below 0.5% by weight. For this purpose the sil(ox)anol of the general formula (III) must, where appropriate, be dried or purified by distillation in order to remove traces of water, which in the case of the polymerization lead to unwanted difunctional byproducts.

In the process of the invention a basic inorganic salt is used as catalyst. In other words, the process takes place under heterogeneous catalysis. The catalyst used is preferably an alkaline earth and/or alkali metal carbonate, alkaline earth and/or alkali metal oxide, an alkaline earth or alkali metal carbonate attached to a support material, an alkaline earth or alkali metal oxide attached to a support material, or a mixture of two or more of the aforementioned compounds.

Examples of alkaline earth metal carbonates and alkali metal carbonates are lithium carbonate, sodium carbonate, magnesium carbonate, calcium carbonate, potassium carbonate, and cesium carbonate, preference being given to potassium carbonate.

Alkaline earth metal oxides and alkali metal oxides are, for example, lithium oxide, sodium oxide or potassium oxide.

Examples of support material are aluminas, titanium dioxides, zirconium oxides, zeolites, silica gels, diatomaceous earths, and ion exchange resins, preference being given to aluminas. Particular preference is given in the process of the invention to employing potassium carbonate, more particularly potassium carbonate supported on alumina.

Potassium carbonate on a support material may be prepared, for example, by evaporating a mixture of alumina and potassium carbonate in water, by drying a mixture of alumina and potassium carbonate that have been triturated with one another under drying conditions, or by hydrolysis of aluminum triisopropoxide, zirconium tetraisopropoxide or titanium tetraisopropoxide in the presence of potassium carbonate. The catalyst is preferably employed in dried form.

In the process of the invention the catalyst is preferably employed in amounts of 0.01%-5% by weight, more preferably 0.1% to 0.5% by weight, based in each case on the total weight of the hexaorganocyclotrisiloxane employed. Preferably the catalyst is removed by filtration for the termination of the reaction.

In order to increase the catalytic selectivity and the conversion it is possible as cocatalyst, if desired, to use a lithium compound as well, preferably a lithium salt, with particular preference an inorganic lithium salt. Examples of such salts are lithium carbonate, lithium chloride, lithium bromide, and lithium sulfate.

The catalyst or catalyst mixture is in powdered form in order to maximize the surface/volume ratio. Preference is given in this context to particle sizes of less than 1 millimeter, with very particular preference of less than 500 micrometers.

Likewise for the purpose of increasing the selectivity of the reaction it is possible to carry out the process of the invention in the presence of polar, aprotic organic solvent(s), where appropriate in a mixture with an apolar solvent. Examples of polar, aprotic organic solvents are acetone, methyl isobutyl ketone (MIBK), methyl ethyl ketone (MEK), dimethylformamide, dimethyl sulfoxide, acetonitrile, tetrahydrofuran, diethyl ether, dibutyl ether, methyl tbutyl ether, diethylene glycol dimethyl ether, polyethylene glycol dimethyl ether, n-butyl acetate, and ethyl acetate. Examples of apolar solvents are toluene, xylene, cyclohexane, methylcyclohexane, heptane, and siloxanes such as octamethylcyclotetrasiloxane, decamethylcyclopentasiloxane, hexamethyldisiloxane or octamethyltrisiloxane.

Depending on the nature of the catalyst containing carbonate ions that is employed, polar, aprotic organic solvent preferably is employed in amounts of 0% to 50% by weight, more preferably 5% to 30% by weight, and with particular preference 5% to 20% by weight, based in each case on the total weight of silanol and hexaorganocyclotrisiloxane.

For improved homogenization of the reaction mixture, apolar organic solvent can be employed in amounts of 0% to 80% by weight, preferably 50% to 70% by weight, based in each case on the total weight of silanol and hexaorganocyclotrisiloxane.

To increase the selectivity and/or rate of the reaction it is possible in the process of the invention to employ mixtures of different solvents.

The solvent is generally removed by distillation after the end of reaction. If the polysiloxane of the invention is to be processed further in solution, however, the removal of the solvent can be dispensed with. In this case, depending on the intended use, it is also possible for high-boiling liquids which can no longer be separated off by distillation, such as polydimethylsiloxanes, to be employed as solvents.

In order to increase the selectivity and/or rate of the reaction it is possible in the process of the invention to use phase transfer catalysts from among quaternary ammonium salts such as benzyltriethylammonium chloride, crown ethers such as 18-crown-6, 1,4,7,10,13-hexaoxacyclooctadecane, polyethylene glycol dimethyl ether, or tertiary amines such as 4-dimethylaminopyridine, N,N-dimethylcyclohexylamine or 1,4-diazabicyclo[2.2.2]octane.

In order to exclude traces of moisture it can be judicious to use driers such as zeolites, anhydrous sodium sulfate or anhydrous magnesium sulfate, in the process of the invention.

The process of the invention is preferably carried out at a temperature which lies above the melting temperature of the reactants that are employed, more preferably at a temperature of 40° C. to 120° C. When using solvents, the reaction is preferably carried out at 60° C. to 110° C. The reaction can be carried out through to full conversion of the hexaorganocyclotrisiloxane, but is preferably discontinued before 100% conversion is reached.

The process of the invention is carried out at atmospheric pressure, subatmospheric pressure or superatmospheric pressure, preferably under the pressure of the surrounding atmosphere, i.e., approximately at 1020 hPa absolute.

The reaction time in the process of the invention, depending on reaction temperature and on identity and quantity of the reactants and solvents employed, is preferably 0.25 to 48 hours. The reaction can be discontinued at less than full conversion by cooling to room temperature and/or removal of the catalyst by filtration. The reaction can also be discontinued by addition of an acid, such as acetic acid, formic acid, 2-ethylhexanoic acid or phosphoric acid.

The process of the invention displays advantages over the prior art as follows. On the one hand, the catalyst employed is simple and easy to prepare and is available commercially, and is unproblematic in its handling, in air for example. The preparation of the inventive diorgano(poly)siloxanes of the general formula (I) with the catalyst of the invention has the further advantage that the catalyst, which is employed in solid form, can easily be removed from the reaction mixture, by means of simple filtration, for example. Moreover, the inventively prepared diorgano(poly)siloxanes of the general formula (I) display high stability on storage.

The inventively prepared diorgano(poly)siloxanes of the general formula (I) can subsequently be functionalized further with suitable organosilanes, in the manner described, for example, in DE 100 51 886 C1, DE 103 03 693 A1, DE 102 19 734 A1 or DE 101 09 842 A1, which are incorporated herein by reference. The diorgano(poly)sioxanes of the general formula (I) prepared by the process of the invention, following functionalization with suitable organic groups, preferably with further organic polymers, butyl acrylates for example, are reacted to form copolymers, and are used, for example, as coatings auxiliaries.

EXAMPLES

The examples below describe certain embodiments in performing the present invention, but without confining it to the content disclosed therein.

Example 1

Preparation of the Supported Catalyst 10.1 g (0.1 mol) of alumina (obtained from Merck KGaA, Darmstadt, Germany) are mixed with 6.9 g (0.1 mol) of anhydrous potassium carbonate (obtained from Merck KGaA, Darmstadt, Germany) and the mixture is ground and heated at 200° C. for 24 hours. The powder is stored in a sealed glass bottle.

Example 2

A mixture of 222 g (1 mol) of hexamethylcyclotrisiloxane is heated at 60° C. in 80 g of methyl ethyl ketone p.a. (obtained from Merck KGaA, Darmstadt, Germany), and 1 g of catalyst from Example 1 is added. Subsequently 30 g (0.33 mol) of trimethylsilanol (water content 0.45%) are added. The mixture is stirred at 60° C. for four hours and filtered over silica gel 60 (obtained from Merck KGaA, Darmstadt, Germany), and the filtrate is concentrated on a rotary evaporator at 40° C. and 5 mbar. This gives 241.6 g of a clear, colorless oil which according to the results of the $^{29}$Si NMR spectrum and of the MALDI-TOF mass spectrum corresponds to a silicone of the following formula: $(CH_3)_3Si-[OSi(CH_3)_2]_9-OH$. The ratio of the Si—OH and $Me_3Si$ end groups according to NMR is 1:1.

The end group ratio remained constant over the observation period of 4 months. The octamethylcyclotetrasiloxane content was 4.2% by weight.

Example 3

Procedure in Analogy to Example 2

A mixture of 666 g (3 mol) of hexamethylcyclotrisiloxane is heated at 60° C. in 200 g of methyl ethyl ketone p.a. (obtained from Merck KGaA, Darmstadt, Germany), and 1 g of potassium carbonate dried at 200° C. is added. Subsequently 30 g (0.33 mol) of trimethylsilanol (water content 0.45%) are added. The mixture is stirred at 60° C. for four hours and filtered over silica gel 60 (obtained from Merck KGaA, Darmstadt, Germany), and the filtrate is concentrated on a rotary evaporator at 40° C. and 5 mbar. This gives 648 g of a clear, colorless oil which according to the results of the $^{29}$Si NMR spectrum and of the MALDI-TOF mass spectrum corresponds to a silicone of the following formula: $(CH_3)_3Si-[OSi(CH_3)_2]_{27}-OH$. The ratio of the Si—OH and Me$_3$Si end groups according to NMR is 1:1.

The end group ratio remained constant over the observation period of 4 months.

Example 4

A mixture of 666 g (3 mol) of hexamethylcyclotrisiloxane is heated at 60° C. in 200 g of methyl ethyl ketone p.a. (obtained from Merck KGaA, Darmstadt, Germany), and 1 g of potassium carbonate dried at 200° C. is added. Subsequently 30 g (0.33 mol) of trimethylsilanol (water content 1.35%) are added. The mixture is stirred at 60° C. for four hours and filtered over silica gel 60 (obtained from Merck KGaA, Darmstadt, Germany), and the filtrate is concentrated on a rotary evaporator at 40° C. and 5 mbar. This gives 648 g of a clear, colorless oil which according to the results of the $^{29}$Si NMR spectrum corresponds to a silicone mixture of the following formula: $(CH_3)_3Si-[OSi(CH_3)_2]_n-OH/H-[OSi(CH_3)_2]_m-OH$. The ratio of the Si—OH and Me$_3$Si end groups according to NMR is 1.1:1. The increased water content of the trimethylsilanol leads to an increased amount of difunctional products.

The end group ratio remained constant over the observation period of 4 months.

Example 5

A mixture of 222 g (1 mol) of hexamethylcyclotrisiloxane is heated at 60° C. in 80 g of methyl ethyl ketone p.a. (obtained from Merck KGaA, Darmstadt, Germany), and 1 g of catalyst from Example 1 is added. Additionally 0.6 g of dried lithium chloride is added as well. Subsequently 30 g (0.33 mol) of trimethylsilanol (water content 0.45%) are added. The mixture is stirred at 60° C. for four hours and filtered over silica gel 60 (obtained from Merck KGaA, Darmstadt, Germany), and the filtrate is concentrated on a rotary evaporator at 40° C. and 5 mbar. This gives 241.6 g of a clear, colorless oil which according to the results of the $^{29}$Si NMR spectrum and of the MALDI-TOF mass spectrum corresponds to a silicone of the following formula: $(CH_3)_3Si-[OSi(CH_3)_2]_9-OH$. The ratio of the Si—OH and Me$_3$Si end groups according to NMR is 1:1.

The end group ratio remained constant over the observation period of 4 months. The octamethylcyclotetrasiloxane content was 1.2% by weight.

Example 6

Comparative Example, not Inventive, in Analogy to EP 1 369 449 A1

A mixture of 222 g (1 mol) of hexamethylcyclotrisiloxane, 96.2 g (1.6 mol) of 2-propanol p.a. (obtained from Merck KGaA, Darmstadt, Germany), and 20 g of 0.4 nm molecular sieve (obtained from Merck KGaA, Darmstadt, Germany) is heated to 60° C. and admixed with a suspension of 1 g of catalyst (from Example 1) in 46.4 g (0.8 mol) of acetone p.a. (obtained from Merck KGaA, Darmstadt, Germany). The mixture is stirred at 60° C. for four hours and filtered over silica gel 60 (obtained from Merck KGaA, Darmstadt, Germany), and the filtrate is concentrated on a rotary evaporator at 40° C. and 5 mbar. This gives 237.3 g of a clear, colorless oil which according to the results of the $^{29}$Si NMR spectrum and the MALDI-TOF mass spectrum corresponds to a silicone of the following formula: $(CH_3)_2CH-[OSi(CH_3)_2]_{44}-OH$. The end group ratio was 1.0:1.01, and rose in the course of the next 2 weeks to 1:1.08 (Si—OH:Si—OR). There was a slight increase likewise in the average molecular weight.

The examples according to the invention show unambiguously that in contrast to the prior art, using particularly simple processes and safe reactants, it is possible to prepare monofunctional silicone oils which, furthermore, are still stable on storage.

The invention claimed is:

1. A process for preparing diorgano(poly)siloxanes of the formula (I)

$$R^1R_2Si(OSiR_2)_m(OSiR^2_2)_nOH \qquad (I),$$

comprising reacting hexaorganocyclotrisiloxane of the formula (II)

$$(R^2_2SiO)_3 \qquad (II)$$

with sil(ox)anols of the formula (III)

$$R^1R_2Si(OSiR_2)_mOH \qquad (III)$$

in the presence of a catalyst, and
optionally driers, solvents, phase transfer catalysts, lithium compounds, or mixtures thereof,
where
  R is a monovalent, unsubstituted or substituted $C_1$-$C_{13}$ hydrocarbon radical,
  $R^1$ is a hydrogen atom or an unsubstituted or substituted $C_1$-$C_{13}$ hydrocarbon radical,
  $R^2$ is a monovalent, unsubstituted or substituted $C_1$-$C_{13}$ hydrocarbon radical,
  m is 0 or an integer of at least 1 to 3 and
  n is an integer of 3 to 1000,
the sil(ox)anols of formula (III) have a water content of below 1% by weight and the catalyst comprises an alkaline earth metal carbonate, alkali metal carbonate, alkaline earth metal oxide, alkali metal oxide or a mixture of two or more of these compounds.

2. The process of claim 1, wherein the catalyst comprises an alkali metal carbonate or alkaline earth metal carbonate on a support material.

3. The process of claim 1, wherein the catalyst is employed in dried form.

4. The process of claim 2, wherein the catalyst is employed in dried form.

5. The process of claim 1, wherein the hexaorganocyclotrisiloxane of the formula (II) is used in amounts of 1 to 333 mol relative to the sil(ox)anol of formula (III).

6. The process of claim 1, wherein the hexaorganocyclotrisiloxane of the general formula (II) is hexamethylcyclotrisiloxane.

7. The process of claim 1, wherein a further additive is a polar, aprotic organic solvent.

8. The process of claim 1, wherein the catalyst is removed by filtration in order to end the reaction.

9. The process of claim 1, wherein an inorganic lithium compound is added as a cocatalyst.

10. The process of claim 1, wherein the water content of the sil(ox)anol (III) is less than 0.5 weight percent.

11. The process of claim 1, wherein the catalyst comprises an alkali metal oxide, alkaline earth metal oxide, or a combination thereof.

* * * * *